United States Patent Office 3,070,492
Patented Dec. 25, 1962

3,070,492
INSECT CONTROL COMPOSITIONS AND METHODS
Arthur Rapport, Glencoe, Ill., assignor to Leeco Chemical Company, Division of Leeco Gas and Oil Co., Miami Beach, Fla., a corporation of Florida
No Drawing. Filed May 26, 1959, Ser. No. 815,811
17 Claims. (Cl. 167—30)

This invention relates to insect control compositions and more particularly to compositions having insecticidal qualities affecting insect species that are resistant to common insecticides.

It has been a recurring experience in the art of insect control for workers to produce a compound which initially demonstrates excellent insecticidal activity for certrain species of insects, only to have those species develop a high resistance, if not complete immunity, to that compound. As a result many insecticides, although initially very effective, have become virtually useless against certain species of insects.

It is an object of this invention to combine insecticides with 1,4-naphthoquinone derivatives to produce compositions lethal to insects that are resistant to those insecticides.

In the specification and claims the word, insect, is employed, and in this context means insects in any stage of their metamorphosis including egg, larva, pupa, and adult, as well as insect-like classes of arthropods such as spiders, mites, ticks, scorpions, and the like. The term, insecticide, includes a composition lethal to any of the foregoing classes of insects and arthropods. The term, 1,4-naphthoquinone derivative, means a compound consisting of 1,4-naphthoquinone which has at least one nuclear hydrogen atom replaced with a substituent group and the term is used interchangeably with the word, additive. The term toxicant means an insecticide whether or not a species of insect under consideration has developed resistance to it.

According to the invention, a derivative or compound of 1,4-naphthoquinone is combined with an insecticide to provide a composition which has been found to have a very lethal effect on insects that are resistant to the insecticide in the composition and that are almost unaffected by the naphthoquinone derivative. Compositions containing as little as 1.0% by weight of naphthoquinone derivative and 99.0% by weight insecticide, as the active ingredient, are effective in controlling insects resistant to that insecticide, and compositions containing as much as 50% naphthoquinone derivative and 50% insecticide as the active ingredient have been found to be effective against such insects. The active ingredient may be used with or without a solvent, dust, wetting agent, water or other substantially non-volatile entraining liquid or other inert carrier to facilitate the application or use thereof. When the active ingredient is employed with a carrier, it may be in the proportion of about 1 part of active ingredient by weight and up to as much as 6000 parts of carrier by weight, or in a concentration as low as about 0.017% by weight of active ingredient and 99.983% by weight of carrier. Where acetone or other volatile carrier is employed with the active ingredient, the proportions of carrier and active ingredient are for practical purposes immaterial since the carrier rapidly evaporates when the mixture is used.

Many 1,4-naphthoquinone derivatives from many classes have been employed in the compositions of this invention including alkyl substituted 1,4-naphthoquinones such as 2-methyl-1,4-naphthoquinone;
2,6-dimethyl-1,4-naphthoquinone, 2-cyclohexyl-1,4-naphthoquinone;
2-methyl-6-valeryl-1,4-naphthoquinone;

chloro-substituted 1,4-naphthoquinones such as 2,3-dichloro-1,4-naphthoquinone;
2-chloro-3-ethoxy-1,4-napthoquinone;
alpha (2-chloro-2,4-naphthoquinone-3-yl) acetoacetic acid;
2-chloro-3-thiomethyl-1,4-naphthoquinone;
2-chloro-3-ethylthio-1,4-naphthoquinone;

thio-substituted 1,4-naphthoquinones such as 2,3-dimethylthio-1,4-naphthoquinone;
2-thiomethyl-1,4-naphthoquinone;
2-methyl-3-thiobenzyl-1,4-naphthoquinone;
2-methyl-3-thioethyl-1,4-naphthoquinone;
2-methyl-3-thiomethyl-1,4-naphthoquinone;
2-methyl-3-dodecylthio-1,4-naphthoquinone;
2,3-dithiomethyl-1,4-naphthoquinone;
2-methyl-3-thiobutyl-1,4-naphthoquinone;

hydroxy-substituted 1,4-naphthoquinones such as 8-hydroxy-1,4-naphthoquinone;
2-hydroxy-1,4-naphthoquinone;
5-hydroxy-1,4-naphthoquinone;
2-hydroxy-3-(4-cyclohexylbutyl) 1,4-naphthoquinone;
2-cyclohexyl-3-hydroxy-1,4-naphthoquinone;
2-hydroxy-3-(2-methylactyl) 1,4-naphthoquinone;
10-[(2-hydroxy)-1,4-naphthoquinone-3 yl] alpha deconoic acid;
2-betanaphthyl-3-hydroxy-1,4-naphthoquinone;

anilino-substituted 1,4-naphthoquinones such as 2-anilino-1,4-naphthoquinone;
bromo-substituted 1,4-naphthoquinones such as
2-bromo-3-cyclohexyl-1,4-naphthoquinone;
expoxide-substituted 1,4-naphthoquinones such as
2-methyl-1,4-naphthoquinone-2,3-epoxide;
benzhydril-substituted 1,4-naphthoquinones such as
2-benzhydril-1,4-naphthoquinone;
amino-substituted 1,4-naphthoquinones such as
2-amino-1,4-naphthoquinone;
acetyl-substituted 1,4-naphthoquinones such as
2-methyl-6-acetyl-1,4-naphthoquinone;
and acetoamido-substituted 1,4-naphthoquinones such as
2-acetoamido-1,4-naphthoquinone.

The insecticides or toxicants which may be used in the compositions of this invention include one or more insecticides from many different classes, for example DDT (1,1,1-trichloro-2,2-bis(p-chlorophenyl) ethane) and methoxychlor (1,1,1-trichloro-2,2-bis(p-methoxyphenyl) ethane) which are both chlorinated aliphatic compounds. Lindane (1,2,3,4,5,6 - hexachlorocyclohexane); dieldrin (1,2,3,4,10,10-hexachloro-6,7-epoxy-1,4,4a,5,6,7,8,8a - octahydro - 1,4,5,8-dimethanonaphthalene); and trichlorobenzene may also be employed, these insecticides being chlorinated cyclic compounds. In addition malathion (O,O-dimethyl dithiophosphate of diethylmercaptosuccinate) a thiophosphate compound may be employed.

The remarkable and unexpected results obtained by the insecticidal compositions of this invention are demonstrated by the following examples reporting observations of the results of these compositions when employed with flies that were known to have high resistance to the insecticides. All of the tests of the following group were conducted in the same manner. In each test 10 milligrams of the toxicant along with the additive to be used were dissolved in acetone. The resultant acetone solution was placed in a petri dish which had a filter paper in the bottom thereof. The acetone solvent was evaporated leaving a filter paper impregnated with the toxicant-additive composition in the bottom of the dish upon which a counted number of flies was placed. The flies' behavior and condition were periodically observed. To obtain control data, in each case a test was conducted employing 10 milligrams of toxicant without additive and the results recorded. Also for the purpose of obtaining control data a number of tests were conducted employing 1 milligram of various naphthoquinone derivatives alone to determine the toxicity of the additives. Table I is a tabulation of the results of these tests in which 1 milligram of each named additive was employed on the same type of resistant flies as those used in subsequently reported tests. The data reported were observed after nine hours' exposure to the additive.

Table I

| Additive: | Percent of flies killed |
|---|---|
| 2-methyl-1,4-naphthoquinone | 13.6 |
| 2,6-dimethyl-1,4-naphthoquinone | 12.4 |
| 2-methyl-3-thiobenzyl-1,4-naphthoquinone | 9.6 |
| 2-methyl-1,4-naphthoquinone-2,3-epoxide | 3.8 |
| 2-benzhydril-1,4-naphthoquinone | 10.0 |
| 2-methyl-3-thiomethyl-1,4-naphthoquinone | 11.0 |
| 2-acetoamido-1,4-naphthoquinone | 12.0 |
| 2,3-dithiocresyl-1,4-naphthoquinone | 13.7 |

Table I illustrates that the additives of this invention have very limited, if any, insecticidal activity in all cases killing less than 14% of the flies in nine hours.

Table II shows in tabular form the greatly enhanced killing power of compositions which DDT and various naphthoquinone derivatives have as compared with either of these materials alone. The tests reported in Table II in all cases except the first were conducted by impregnating filter paper with a composition comprising 10 milligrams of DDT and 1 milligram of additive as described hereinbefore. The first test employed 10 milligrams of DDT and no additive and is reported for purposes of comparison as hereinbefore stated.

Table II

| Additive: | Percent of flies killed |
|---|---|
| None | 7.0 |
| 2-methyl-1,4-naphthoquinone | 84.0 |
| 2,6-dimethyl-1,4-naphthoquinone | 62.0 |
| 2-methyl-3-thiobenzyl-1,4-naphthoquinone | 76.0 |
| 2-methyl-1,4-naphthoquinone-2,3-epoxide | 74.0 |
| 2-benzhydril-1,4-naphthoquinone | 70.0 |
| 2-methyl-3-thiomethyl-1,4-naphthoquinone | 73.0 |
| 2-acetoamido-1,4-naphthoquinone | 76.5 |
| 2,3-dithiocresyl-1,4-naphthoquinone | 67.0 |

The data of Table I and Table II indicate that the expected killing power of the composition comprising 10 milligrams of DDT plus 1 milligram of additive should be 20.7% at a maximum, the sum of the maximum killing power of each by itself. The data in Table II however illustrates that the addition of 1 milligram of additive produces a composition having more than three times the combined insecticidal effects of the additive and toxicant employed separately, i.e. 13.7% plus 7%.

In similar tests employing the same species of flies, 10 milligrams of malathion by itself killed 8.4% of the flies, while 10 milligrams of malathion plus 5 milligrams of 2-methyl-3-thiobenzyl-1,4-naphthoquinone killed 96.5%, and each of a mixture of 10 milligrams of malathion and 5 milligrams of 2-methyl-1,4-naphthoquinone-2,3-epoxide and 10 milligrams of malathion and 5 milligrams of 2-acetoamido-1,4-naphthoquinone killed 100% of the resistant flies.

In other similar tests, 10 milligrams of dieldrin by itself killed 5.9% of a group of resistant flies, while a mixture of 10 milligrams of dieldrin with 5 milligrams of 2-methyl-2-thiobenzyl-1,4-naphthoquinone killed 87.6%; a mixture of 10 milligrams dieldrin and 5 milligrams of 2-thiomethyl-1,4-naphthoquinone killed 88.5%; and a mixture of 10 milligrams of dieldrin and 5 milligrams of 2-anilino-1,4-naphthoquinone killed 80% of the resistant flies.

In view of the varying physiology and other characteristics of insects as well as the varying nature of different insecticides, the formula variations comprehended by this invention result in somewhat varying effects on the same insects. Moreover all of the various insects are not necessarily identically affected by any given insecticidal composition. For some insecticidal compositions employed against some species of insects, very small quantities of additive exhibit dramatically improved results over the use of the insecticide per se. For example, DDT alone employed with highly resistant flies killed only 25%, while a mixture of 97.5% DDT and 2.5% 2-methyl-1,4-naphthoquinone killed 75% of such flies. One part of a mixture containing as an active ingredient 49% DDT, 30% malathion, 20% trichlorobenzene and 1% 2-methyl-1,4-naphthoquinone, blended with about 50 parts of inert carrier is effective in almost completely controlling adult psychoda flies that are unaffected by the mixture of DDT, malathion, trichlorobenzene and the carrier alone.

Psychoda flies are particularly tenacious nuisances found in trickling filters of sewage treatment plants and in the vicinity thereof. Psychoda larvae attach themselves to the filter stones and develop to adults in the environment of the liquid sewage. Although the larvae are all accumulated in a medium that is easy to control, they are, because of their resistance to insecticides in this stage of development, difficult to kill. To add to the difficulty, killing larvae must be accomplished without killing the microorganisms on the filter stones since these organisms are necessary to the digestion of the sewage. Psychoda flies and larvae in many localities have developed resistance to DDT, malathion, trichlorobenzene, dieldrin, chlordane, and other common insecticides as well as mixtures thereof.

As a further example of this invention, a composition of the following was employed in a trickling filter infested with psychoda larvae.

Table III

| Ingredient: | Weight percent |
|---|---|
| DDT (toxicant) | 24.5 |
| Malathion (toxicant) | 15.0 |
| Trichlorobenzene (toxicant) | 10.0 |
| 2-methyl-1,4-naphthoquinone (additive) | 0.5 |
| Xylene and other inert ingredients | 50.0 |

The trickling filter had been treated previously with DDT, malathion, and trichlorobenzene alone and in various combinations, but the psychoda larvae were either resistant to these insecticides or else they rapidly developed resistance to them. The psychoda larvae were completely unaffected by 2-methyl-1,4-naphthoquinone by itself.

Treatment of the trickling filter was effected by introducing one part of the composition described in Table III to 600 parts of water flowing from a primary settling tank to the trickling filter. After dosing the trickling filter with this composition through a rotary distributor, the normal flow of sewage from the primary settling tank was stopped, and the stones thus treated were allowed to stand undisturbed for an hour. When the normal operation of the filter was resumed, countless thousands of dead psychoda larvae appeared in the effluent from the trickling filter. Examination of the stones revealed that virtually 100% or removal of psychoda larvae was obtained and that the beneficial film of microorganisms was not disturbed.

An emulsion of 50 parts of water and one part of the composition described in Table III was sprayed on the walls and other surfaces in the vicinity of the trickling filter. Contact with this composition resulted in the death of almost all of the adult psychoda in the area. The control of psychoda larvae and adults from this treatment lasted in excess of seven weeks, which is a remarkably long period of control considering that a new generation of psychoda is produced about every seven to twenty-one days, depending on the temperature.

In the composition described in Table III, xylene served as a solvent or carrier for the other ingredients and it accounted for 40% of the total composition while 10% of other inert ingredients were used. Although xylene is known to be a mild insecticide, its insecticidal effect is so small in the present composition that it can be considered inert and performing substantially only the function of a solvent or carrier for the active ingredients of the composition. The other inert ingredients were alkylarylpolyether alcohols and glycerol phthalate resins which were employed as dispersants. Other detergents or surface active agents may be used for this purpose, and other solvents, either volatile or non-volatile, may be employed as a carrier for the insecticidal composition.

It may be noted in connection with the foregoing that the active ingredient of the composition of Table III contained about 1% by weight of 1,4-naphthoquinone derivative.

The insecticidal compositions of this invention solve a long existing and perplexing problem in that they are effective against insect species that have developed resistance to the common insecticides. This effectiveness is obtained through the use of the same insecticide that the species is resistant to, combined with a small quantity of an additive which in itself does not have insecticidal activity against that species.

Having thus described the invention, what is claimed is:

1. A composition for controlling insects which comprises, as an active ingredient from about 50% to about 99% by weight of an insecticide selected from the group consisting of 1,1,1-trichloro-2,2 - bis(p - chlorophenyl) ethane, 1,1,1-trichloro-2,2-bis(p-methoxyphenyl) ethane, trichlorobenzene, O,O-dimethyl dithiophosphate of diethylmercaptosuccinate and mixtures thereof, and from about 50% to about 1% by weight of a 1,4-naphthoquinone derivative.

2. In an insecticidal composition, an active ingredient comprising from about 50% to about 99% by weight of an insecticide selected from the group consisting of 1,1,1-trichloro-2,2-bis(p-chlorophenyl) ethane, 1,1,1-trichloro-2,2-bis(p-methoxyphenyl) ethane, trichlorobenzene, O,O-dimethyl dithiophosphate of diethylmercaptosuccinate and mixtures thereof, and from about 50% to about 1% by weight of a 1,4-naphthoquinone derivative.

3. A composition for controlling insects which have become resistant to DDT which comprises, as an active ingredient, from about 50% to about 99% by weight of DDT and from about 50% to about 1% by weight of a 1,4-naphthoquinone derivative.

4. A composition for controlling insects which have become resistant to DDT which comprises, as an active ingredient, from about 50% to about 99% by weight of DDT and from about 50% to about 1% by weight of 2-methyl-1,4-naphthoquinone.

5. A composition for controlling insects which have become resistant to malathion which comprises, as an active ingredient, from about 50% to about 99% by weight of malathion and from about 50% to about 1% by weight of a 1,4-naphthoquinone derivative.

6. A composition for controlling insects which have become resistant to malathion which comprises, as an active ingredient, from about 50% to about 99% by weight of malathion and from about 50% to about 1% by weight of 2-methyl-1,4-naphthoquinone-2,3-epoxide.

7. A composition for controlling insects resistant to dieldrin which comprises, as an active ingredient, from about 50% to about 99% by weight of dieldrin and from about 50% to about 1% by weight of 2-thiomethyl-1,4-naphthoquinone.

8. A composition for controlling insects which have become resistant to DDT which comprises, as an active ingredient, from about 50% to about 99% by weight of DDT and from about 50% to about 1% by weight of 2,6-dimethyl-1,4-naphthoquinone.

9. A composition for controlling insects which have become resistant to malathion which comprises, as an active ingredient, from about 50% to about 99% by weight of malathion and from about 50% to about 1% by weight of 2-acetoamido-1,4-naphthoquinone.

10. A composition for controlling insects resistant to DDT, malathion, and trichlorobenzene, which comprises, as an active ingredient, about 49% by weight DDT, about 30% by weight malathion, about 20% by weight trichlorobenzene, and about 1% 2-methyl-1,4-naphthoquinone.

11. A composition for controlling insects resistant to DDT, malathion, and trichlorobenzene, which comprises, as an active ingredient, about 24.5% by weight of DDT, about 15% by weight malathion, about 10% by weight trichlorobenzene, and about 0.5% by weight 2-methyl-1,4-naphthoquinone, and, as a carrier, about 50% by weight of solvent and other inert ingredients.

12. The composition of claim 11 further characterized in that said solvent comprises xylene.

13. The composition as set forth in claim 1 further characterized in that said active ingredient is mixed with a carrier, said carrier constituting from about 0% to about 99.98% by weight of the resultant mixture.

14. In an insecticidal composition for controlling insects resistant to DDT, an active ingredient comprising from about 50% to about 99% of DDT by weight of said active ingredient and from about 50% to about 1% of 2-methyl-1,4-naphthoquinone.

15. A method for controlling DDT resistant insects which comprises applying to said insects a composition having as an active ingredient from about 50% to about 99% by weight of DDT and from about 50% to about 1% by weight of a 1,4-naphthoquinone derivative.

16. A method for controlling malathion resistant insects which comprises applying to said insects a composition having as an active ingredient from about 50% to about 99% by weight of malathion and from about 50% to about 1% by weight of a 1,4-naphthoquinone derivative.

17. A method for controlling DDT resistant insects which comprises applying to said insects a composition which comprises as an active ingredient from about 50% to about 99% by weight of an insecticide selected from the group consisting of 1,1,1-trichloro-2,2-bis(p-chlorophenyl) ethane, 1,1,1-trichloro-2,2-bis(p-methoxyphenyl) ethane, trichlorobenzene, O,O-dimethyl dithiophosphate of diethylmercaptosuccinate and mixtures thereof, and from about 50% to about 1% by weight of a 1,4-naphthoquinone derivative.

References Cited in the file of this patent

King: U.S. Dept. Agr. Handbook No. 69, May 1954, pages 67, 145, 147, 237.